(12) United States Patent
Burns et al.

(10) Patent No.: US 10,576,726 B2
(45) Date of Patent: Mar. 3, 2020

(54) 3D-PRINTING SYSTEMS CONFIGURED FOR ADVANCED HEAT TREATMENT AND RELATED METHODS

(71) Applicant: Baker Hughes, a GE Company, LLC, Houston, TX (US)

(72) Inventors: Madison S. Burns, Celle (DE); Luke Alan Boyer, Houston, TX (US); Christoph Wangenheim, Hemmingen (DE); James Andy Oxford, Magnolia, TX (US); Sobieslaw Gacek, Kingwood, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 750 days.

(21) Appl. No.: 15/085,555

(22) Filed: Mar. 30, 2016

(65) Prior Publication Data
US 2017/0282457 A1  Oct. 5, 2017

(51) Int. Cl.
*B29C 64/30* (2017.01)
*B33Y 30/00* (2015.01)
(Continued)

(52) U.S. Cl.
CPC ............. *B33Y 30/00* (2014.12); *B29C 64/30* (2017.08); *B29C 71/02* (2013.01); *B33Y 10/00* (2014.12);
(Continued)

(58) Field of Classification Search
None
See application file for complete search history.

(56) References Cited

U.S. PATENT DOCUMENTS 5,155,324 A  10/1992  Deckard et al.
5,387,380 A   2/1995  Cima et al.
(Continued)

OTHER PUBLICATIONS

Alec, www.3ders.org, 3D printer and 3D printing news, Metal FAB1 Metal 3D pirnter unveiled with '10X reproducibility, productivity and flexibility, Nov. 17, 2015, 12 pages.
(Continued)

*Primary Examiner* — Monica A Huson
*Assistant Examiner* — Kelsey C Grace
(74) *Attorney, Agent, or Firm* — TraskBritt (57) ABSTRACT

In some embodiments, systems for creating and heat-treating 3D-printed objects may include a 3D printer configured to create the object. A heat-treatment apparatus may be operatively connected to the 3D printer. The heat-treatment apparatus may be configured to expose the object to an elevated temperature to heat-treat the object. A pressure-transmission medium of the heat-treatment apparatus may be configured to apply pressure to the object during heat treatment. The 3D printer and heat-treatment apparatus may be incorporated into a unified process flow volume. Methods of creating and heat-treating 3D-printed objects may involve creating an object utilizing a 3D printer. The object may be moved from the 3D printer to a heat-treatment apparatus. The object may be exposed to an elevated temperature and pressure may be applied to the object utilizing a pressure-transmission medium of the heat-treatment apparatus. The 3D printer and heat-treatment apparatus may in a unified process flow volume.

16 Claims, 4 Drawing Sheets

(51) Int. Cl.
    *B33Y 10/00*    (2015.01)
    *B29C 71/02*    (2006.01)
    *B29C 35/08*    (2006.01)

(52) U.S. Cl.
    CPC . *B29C 2035/0811* (2013.01); *B29C 2071/022* (2013.01); *B29K 2995/0087* (2013.01)

(56) References Cited

U.S. PATENT DOCUMENTS

| | | |
|---|---|---|
| 5,433,280 A | 7/1995 | Smith |
| 6,036,777 A | 3/2000 | Sachs |
| 6,200,514 B1 | 3/2001 | Meister |
| 6,528,771 B1 | 3/2003 | Matsen et al. |
| 6,596,224 B1 | 7/2003 | Sachs et al. |
| 7,259,353 B2 | 8/2007 | Guo |
| 7,776,256 B2 | 8/2010 | Smith et al. |
| 8,344,283 B2 | 1/2013 | Watanabe |
| 8,568,124 B2 | 10/2013 | Brunermer |
| 2005/0056628 A1 | 3/2005 | Hu |
| 2005/0225007 A1 | 10/2005 | Lai et al. |
| 2012/0033002 A1* | 2/2012 | Seeler ............... B22F 3/105 346/74.2 |
| 2013/0341320 A1 | 12/2013 | Tailor et al. |
| 2014/0291886 A1* | 10/2014 | Mark ............... B29C 70/384 264/163 |
| 2015/0024169 A1* | 1/2015 | Martin ............... B29C 67/0092 428/172 |

OTHER PUBLICATIONS additiveindustries.com/industrial-am-systems/metalfab1, Metal FAB1, visited Jan. 4, 2016, 6 pages.

Millsaps, Bridget Butler, Metal FAB1 Unveiled: Additive Industries Presents the First Truly Industrial 3D Metal Printing System, Additive Industries, http"//3dprint.com/106140/metalfab1-additive-industries/, Nov. 17, 2015, 8 pages.

O'Connor, Daniel, Additive Industries Launch the Metal FAB1: A complete Industrial Metal 3D Printer, TCT Accelerating 3D Technologies,http:www.tctmagazine.com/3D-printing-news/additive-industries-launch-metal-3d-printer-at-rapid/, May 19, 2015, 7 pages.

\* cited by examiner

3D-PRINTING SYSTEMS CONFIGURED FOR ADVANCED HEAT TREATMENT AND RELATED METHODS

FIELD

This disclosure relates generally to additive manufacturing systems, such as, for example, 3D printers, configured for manufacturing 3D objects. More specifically, disclosed embodiments relate to 3D-printing systems that may improve the quality of a 3D-printed object while increasing efficiency of the 3D printing process.

BACKGROUND

Components of earth-boring tools may be produced primarily by an initial formation process, followed by subsequent subtractive and occasionally additive manufacturing processes. For example, a body of an earth-boring tool may be cast or sintered, and subsequent machining may remove material from the body to meet manufacturing tolerances, cutting elements may be brazed to the body, and hardfacing may be selectively applied to surfaces of the body.

3D printing, which is generally accomplished via layer-by-layer addition of material to form an object, is frequently used in rapid prototyping, usually with a material not suitable for use with earth-boring tools, such as, for example, plastic, wax, or porous metal. However, 3D printing has been proposed for use in forming earth-boring tools, as disclosed in U.S. Pat. No. 5,433,280, issued Jul. 18, 1995, to Smith, U.S. Pat. No. 6,200,514, issued Mar. 13, 2001, to Meister, and 7,776,256, issued Aug. 17, 2010, to Smith et al., each of which is assigned to the assignee of the present application and the disclosure of each of which is incorporated herein in its entirety by this reference. As disclosed, however, these 3D printing process produced a porous body of mutually bonded particles of metal material requiring, among other subsequent acts, infiltration with a molten metal infiltrant material and finish machining to produce a finished part, such as for example, a drill bit body.

Further, conventional 3D printing apparatus using, for example, laser melting, do not enable production of a finished product, or a substantially finished product.

BRIEF SUMMARY

In some embodiments, systems for creating and heat-treating 3D-printed objects may include a 3D printer configured to create the objects. A heat-treatment apparatus may be operatively connected to, and distinct from, the 3D printer. The heat-treatment apparatus may be configured to expose the object to an elevated temperature to heat-treat the object. A pressure-transmission medium of the heat-treatment apparatus may be configured to apply pressure to the object during heat treatment. The 3D printer and heat-treatment apparatus may be incorporated into a unified process flow volume.

In other embodiments, methods of creating and heat-treating 3D-printed objects may involve creating an object utilizing a 3D printer. The object may be moved from the 3D printer to a heat-treatment apparatus operatively connected to, and distinct from the enclosure of, the 3D printer. The object may be exposed to an elevated temperature utilizing the heat-treatment apparatus and pressure may be applied to the object utilizing a pressure-transmission medium of the heat-treatment apparatus to heat-treat the object. The 3D printer and heat-treatment apparatus may be incorporated into a unified process flow volume.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular 3D-printing system, module, or component thereof, but are merely idealized representations employed to describe illustrative embodiments. Thus, the drawings are not necessarily to scale.

Disclosed embodiments relate generally to 3D-printing systems that may improve the quality of a 3D-printed object while increasing efficiency of the 3D printing process, such as, for example, by saving time and reducing (e.g., eliminating) the need for third-party manufacturers. More specifically, disclosed are embodiments of 3D-printing systems that may include at least some of unused material management, stress relief, advanced heat treatment, quenching, in-situ quality monitoring, surface finishing, and subtractive machining for 3D-printed objects and an object-transfer mechanism within a unified process flow volume. In some embodiments, the unified process flow volume may isolate the process flow from the environment to improve clean manufacturing conditions and better control temperature, pressure, atmospheric composition, and unwanted radiation. The unified process flow volume may also reduce the risk of accidents in some embodiments. The unified process flow volume may define the volume in which an automated process flow takes place.

As used in this disclosure, the term "unified process flow volume" means and includes an enclosable, three-dimensional space within which a process may be initiated, performed, and completed. For example, unified process flow volumes include special-purpose machines that perform a process within a single, unitary, shared housing; modular machines that perform a process within the housings of physically and operatively connected, independently operable modules; and a building within which a process is performed utilizing equipment within the building.

Figure 1:
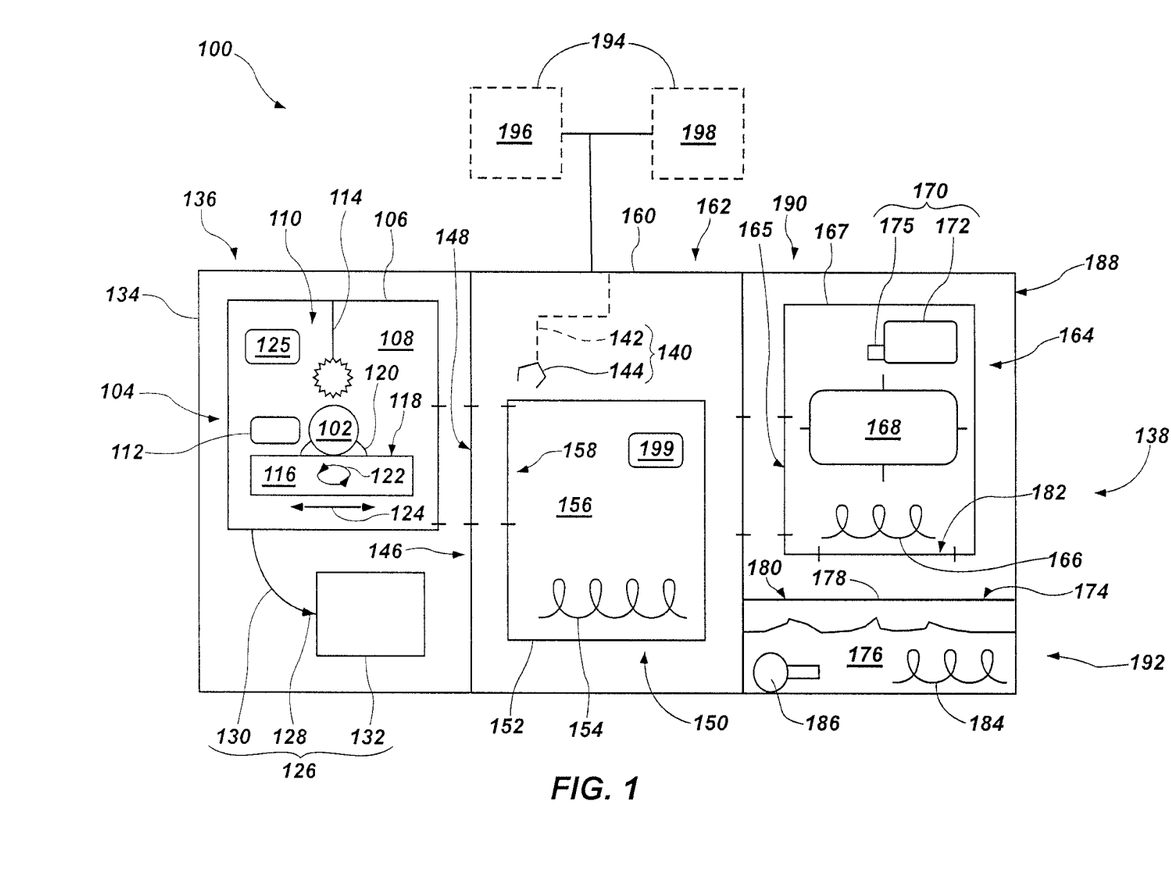
FIG. 1 is a schematic side view of a system for creating and heat-treating a 3D-printed object.

Referring to FIG. 1, a schematic side view of a system 100 for creating and heat-treating a 3D-printed object 102 is shown. The system 100 may include, for example, a 3D printer 104 configured to form the 3D-printed object 102 at least partially by additive manufacturing. Examples of suitable 3D printers 104 configured to form 3D-printed objects 102 are disclosed in U.S. Pat. No. 5,155,324, issued Oct. 13, 1992, to Deckard et al. and U.S. Pat. No. 5,387,380, issued Feb. 7, 1995, to Cima et al., the disclosure of each of which is incorporated herein in its entirety by this reference. The 3D printer 104 may include an enclosure 106 sized and shaped to contain the 3D-printed object 102. The enclosure 106 may include an interior 108 of sufficient volume to contain, for example, the 3D-printed object 102 and at least portions of at least some operative components of the 3D printer 104. For example, the volume of the interior 108 of the enclosure 106 may be at least about 0.125 m$^3$. More specifically, the volume of the interior 108 of the enclosure 106 may be, for example, at least about 1 m$^3$. As a specific, nonlimiting example, the volume of the interior 108 of the enclosure 106 may be, for example, between about 1.125 m$^3$ and about 70 m$^3$. In some embodiments, the enclosure 106 may include an opening 110 configured to grant a user selective access to the interior 108 of the enclosure 106. In other embodiments, the interior 108 of the enclosure 106 may not be accessible to a user without disassembly of at least a portion of the enclosure 106, such as, for example, by removing a sidewall of the enclosure 106.

The 3D printer 104 may include a precursor material source 112 configured to provide metal material to be melted to sequentially form layers of the 3D-printed object 102. The precursor material source 112 may comprise, for example, a nozzle operatively connected to a reservoir of powder in a flowable medium (e.g., argon, nitrogen, air), a powder bed having a movable delivery column of metal powder and a distributor (e.g., a roller or pusher) to distribute quantities of the metal powder, a spool of metal powder embedded in a solid, destructible transport medium (e.g., wax, a polymer), or a spool of metal wire, or an extruded column of the precursor material. Specific, nonlimiting examples of precursor material sources 112 for use in the 3D printer 104 are disclosed in U.S. Pat. No. 6,036,777, issued Mar. 14, 2000, to Sachs; U.S. Pat. No. 6,596,224, issued Jul. 22, 2003, to Sachs et al.; U.S. Patent App. Pub. No. 2005/0225007, published Oct. 13, 2005, to Lai et al.; U.S. Pat. No. 8,568,124, issued Oct. 29, 2013, to Brunermer; the disclosure of each of which is incorporated herein in its entirety by this reference. The precursor material source 112 may be at least partially located within the enclosure 106 of the 3D printer 104. For example, the precursor material source 112 may be entirely located within the enclosure 106 of the 3D printer 104. As another example, a dispensing portion of the precursor material source 112 may be located within the enclosure 106, and a reservoir portion of the precursor material source 112 operatively connected to the dispensing portion may be located outside the enclosure 106.

Material in the precursor material source 112 may include a metal material. For example, material in the precursor material source 112 may include fine particles of or a wire including metal and/or metal alloy material and may optionally further include plastic, ceramic, and/or organic material. More specifically, material in the precursor material source 112 may include, for example, cobalt, nickel, copper, chromium, aluminum, iron, steel, stainless steel, titanium, tungsten, or alloys and mixtures thereof, magnetically responsive materials, polyetheretherketone (PEEK™), carbon-based materials (e.g., graphite, graphene, diamond, etc.), and/or glass. Specific, nonlimiting examples, of materials that may be included in the precursor material source 112 may include PA12-MD(Al), PA12-CF, PA11, 18 March 300/1.2709, 15-5/1.4540, 1.4404 (316L), Alloy 718, Alloy 625, CoCrMo, UNS R31538, Ti6AI4V and AlSi10Mg, Alloy 945x, 17-4/1.4542, Alloy 925, CrMnMoN-steel, CoCr Alloys (STELLITE®), CoNi Alloy, MP35 or equivalent, 4140, 4145, WC—Ni, WC—Co, and/or W. As another example, material in the precursor material source 112 may include fine particles of metal or metal alloy material intermixed with fine particles of ceramic material, the material being configured to form a metallic-ceramic composite material (e.g., a cermet), in which ceramic particles are embedded within a metal or metal alloy matrix, upon melting and coalescence of the particles of metal and/or metal alloy material. More specifically, material in the precursor material source 112 may be fine particles of cobalt, nickel, iron, steel, stainless steel, or alloys and mixtures thereof intermixed with fine particles of tungsten carbide, titanium carbide, tantalum carbide, molybdenum carbide, and other metal-carbide ceramic materials.

In embodiments where the material in the precursor material source 112 includes metal powder, an average particle size of particles of powdered material in the precursor material source 112 may be, for example, about 500 µm or less. More specifically, the average particle size of particles of powdered material in the precursor material source 112 may be, for example, about 200 µm or less. As specific, nonlimiting examples, the average particle size of particles of powdered material in the precursor material source 112 may be between about 10 nm and about 500 nm, such as, for example, when nanoparticles or mostly nanoparticles are used (e.g., between about 20 nm and about 100 nm or between about 200 nm and about 350 nm); between about 500 nm and about such as, for example, when an at least substantially equal mixture of nanoparticles and microparticles is used (e.g., between about 750 nm and about 900 nm); or between about 1 µm and about 500 such as, for example, when microparticles or mostly microparticles are used (e.g., between about 15 µm and about 45 µm or between about 50 µm and about 110 µm). In some embodiments, the particles of powdered material in the precursor material source 112 may exhibit a multi-modal (e.g., bi-modal, tri-modal, etc.) particle size distribution. In other embodiments, the particles of powdered material in the precursor material source 112 may exhibit a mono-modal particle size distribution. A volume percentage of particles of metal and/or metal alloy particles in the precursor material source 112 may be, for example, about 40% or less when the material in the precursor material source 112 further includes particles of ceramic material. More specifically, the volume percentage of particles of metal and/or metal alloy particles in the precursor material source 112 may be, for example, about 30% or less when the material in the precursor material source 112 further includes particles of ceramic material. As a specific, nonlimiting example, the volume percentage of particles of metal and/or metal alloy particles in the precursor material source 112 may be between about 5% and about 20% when the material in the precursor material source 112 further includes particles of ceramic material.

The 3D printer 104 may include a focused heat source 114 of sufficient power to at least partially melt metal material from the precursor material source 112. The focused heat source 114 may be, for example, a ytterbium-fiber optic laser, a carbon dioxide laser, an electron beam emitter. A power rating of the focused heat source 114 may be, for example, about 150 Watts or more. More specifically, the power rating of the focused heat source 114 (e.g., the maximum power consumed by the focused heat source 114 during operation) may be, for example, about 200 Watts or more. As a specific, nonlimiting example, the power rating of the focused heat source 114 may be 300 Watts or more. The focused heat source 114 may be at least partially located within the enclosure 106 of the 3D printer 104. For example, the focused heat source 114 may be entirely located within the enclosure 106 of the 3D printer 104. As another example, an emitting portion of the focused heat source 114 may be located within the enclosure 106, and a power source portion of the focused heat source 114 operatively connected to the emitting portion may be located outside the enclosure 106. Specific, nonlimiting embodiments of focused heat sources are disclosed in, for example, U.S. Pat. No. 8,344,283, issued Jan. 1, 2013, to Watanabe; U.S. Pat. No. 7,259,353, issued Aug. 21, 2007, to Guo; U.S. Patent App. Pub. No. 2005/0056628, published Mar. 17, 2005, to Hu, the disclosure of each of which is incorporated herein in its entirety by this reference.

In addition, the 3D printer 104 may include a handling platform 116 positioned, sized and shaped to support the object 102 to be formed thereon and to receive material from the precursor material source 112. The handling platform 116 may include, for example, a surface 118 on which the object 102 may be supported during formation and, optionally, during subsequent handling and processing. The handling platform 116 may include, for example, a securing mechanism 120 configured to retain the object 102 on the handling platform 116 during formation and, optionally, during subsequent handling and processing. The securing mechanism 120 may include, for example, a clamp, a depth-selectable recess, a selectively activatable electromagnet, a selectively activatable vacuum, or any other mechanism for selectively securing an object 102 to a surface 118. The handling platform 116 may be at least partially located within the enclosure 106 of the 3D printer 104. For example, the handling platform 116 may be entirely located within the enclosure 106 of the 3D printer 104. As another example, the surface 118 of the handling platform 116 may be located within the enclosure 106, and a remainder of the handling platform 116 may be located outside the enclosure 106.

In some embodiments, the handling platform 116 may be movable to remove the handling platform 116 from the enclosure 106, to aid with removal of unbonded, excess material (e.g., powder), or both. For example, the handling platform 116 may include a handling platform rotator 122 configured to rotate the handling platform 116 about at least one axis of rotation, an object vibrator 124 configured to linearly or rotationally vibrate the 3D printed-object 102 along or around at least one axis, or both. More specifically, the handling platform 116 may include a handling platform rotator 122 configured to overturn the handling platform 116, such that the surface 118 on which the object 102 is supported changes from an upward-facing orientation to a downward-facing orientation, or configured to rotate the handling platform 116 about an axis at least substantially perpendicular to the surface 118 of the handling platform 116, and an object vibrator 124 configured to oscillate linearly along a horizontal axis to assist with removal of unbonded material (e.g., powder particles) from the object 102.

The 3D printer 104 may be configured to produce the 3D-printed object 102 by additive manufacturing techniques. For example, the 3D printer 104 may employ selective laser melting, direct metal laser sintering, selective laser sintering, electron beam manufacturing, direct laser deposition, cold gas processing, lacer cladding, direct material deposition, ceramic additive manufacturing, or binder jetting and subsequent sintering to form the 3D-printed object 102 layer by layer from mutually bonded layers of at least partially melted metal material from the precursor material source 112. When the focused heat source 114 is in use, the interior 108 of the enclosure 106 may be enclosed and inaccessible by a user to decrease the likelihood that the focused heat source 114 will harm the user. For example, the focused heat source 114 may only be activatable when the opening 110 is shut (e.g., by a door), and the opening 110 may be locked shut until the focused heat source 114 is inactive. As another example, the focused heat source 114 may only be activatable when the opening 110 is shut (e.g., by a door), and unblocking the opening 110 may trigger a fail-safe, causing the focused heat source 114 to turn off.

In some embodiments, the 3D printer 104 may include an atmospheric fluid source 125 operatively connected to the enclosure 106 of the 3D printer 104. In such embodiments, the enclosure 106 may be sealed by an airtight seal, and the atmospheric fluid source 125 may introduce an atmospheric fluid into the interior 108 of the enclosure 106 to alter the compositional makeup of the atmosphere within the enclosure 106. Any preexisting atmospheric fluid within the enclosure 106 may be displaced and permitted to exit via an outlet (e.g., the material removal system 126 discussed in greater detail below). The atmospheric fluid within the atmospheric fluid source 125 may be, for example, an inert gas. More specifically, the atmospheric fluid within the atmospheric fluid source 125 may include, for example, argon. The atmospheric fluid source 125 may be, for example, a tank containing the atmospheric fluid, optionally under pressure.

A material removal system 126 may be operatively connected to the enclosure 106 of the 3D printer 104. The material removal system 126 may be configured to remove unused or excess metal material (e.g., powder particles that are not bonded to form the object 102 by any atomic, molecular, or adhesive bond or excess material bonded to the object 102) from the interior 108 of the enclosure 106. The material removal system 126 may include, by way of nonlimiting example, brushing, wiping, washing, and creating a pressure differential utilizing a vacuum 128 configured to create a pressure differential in at least a portion of the interior 108 of the enclosure 106 to remove unbonded material from the enclosure 106. For example, the vacuum 128 may include a hose 130 connected to the interior 108 of the enclosure 106 and a receptacle 132 connected to the hose 130. The vacuum 128 may create a pressure differential between the interior 108 of the enclosure 106 and the receptacle 132, causing unbonded material to be drawn out of the interior 108 of the enclosure 106 to the receptacle 132 by moving environmental fluid (e.g., air) from the interior 108 of the enclosure 106, through the hose 130, to the receptacle 132. In other embodiments, the material removal system 126 may include a subtractive manufacturing system 228 (see FIG. 2) as described in greater detail below (e.g., to cut away excess material bonded to the object 102) or a pressurization mechanism (e.g., a pump) configured to pressurize the enclosure 106 to stir any unbonded material followed by depressurization and brushing or agitating to complete removal. The material removal system 126 may be operable without human intervention, including automatic initiation, operation, and cessation of the selective application of a pressure differential to remove unbonded material from the interior 108 of the enclosure 106. The receptacle 132 may further be operatively connected to the precursor material source 112, such that unbonded material removed from the interior 108 of the enclosure 106 may be recycled for use by the precursor material source 112 in producing a 3D printed object 102. The material removal system 126 may be at least partially located within the enclosure 106 of the 3D printer 104. For example, the material removal system 126 may be entirely located within the enclosure 106 of the 3D printer 104. As another example, the hose 130 of the material removal system 126 may be open to the enclosure 106, and a remainder of the hose 130 and the receptacle 132 may be located outside the enclosure 106.

In some embodiments, the 3D printer 104 and material removal system 126 may be physically contained within a shared housing 134 to form an independently operable module 136. More specifically, the enclosure 106, precursor material source 112, focused heat source 114, handling platform 116, securing mechanism 120, handling platform rotator 122, object vibrator 124, atmospheric fluid source 125, hose 130, receptacle 132, and pump may be located within the shared housing 134 and function cooperatively as an independently operable module 136 to produce a 3D-printed object 102, remove unbonded material from the interior 108 of the enclosure 106, and recycle the unbonded material for reuse by the precursor material source 112. The independently operable module 136 may be configured for physical and operative connection to other modules to form a unified process flow volume 138. In some embodiments, the system 100 may include multiple 3D printers 104 to enable concurrent, additive manufacturing of multiple objects 102.

The system 100 may include an object-transfer mechanism 140 operatively connected to the 3D printer 104, the object-transfer mechanism 140 being configured to selectively move the handling platform 116 and the object 102 supported thereon at least from the enclosure 106 of the 3D printer 104. The object-transfer mechanism 140 may be, for example, a robotic arm 142 configured to lift, move, and orient the handling platform 116 and the object 102 supported thereon and an attachment mechanism 144 configured to secure the robotic arm 142 to the handling platform 116, object 102, or both. The attachment mechanism 144 may include, for example, a grasper, an electromagnet, or a key configured to interface with a slot or slots in the handling platform 116, object 102, or both. The robotic arm 142 may enter the enclosure 106, for example, through a selectively closeable opening 14R in a sidewall 146 of the shared housing 134 of the independently operable module 136. In some embodiments, the system 100 may include multiple object-transfer mechanisms 140 to enable concurrent transfer of multiple objects 102.

The system 100 may include a stress-relief furnace 150 operatively connected to, and distinct from, the 3D printer 104. The stress-relief furnace 150 may be configured to expose the object 102 to a first temperature to reduce residual stresses within the object 102. When an object 102 is produced by additive manufacturing techniques, such as those employed by the 3D printer 104, the cyclic heating and cooling of regions of the object 102 to fuse together particles from the precursor material source 112 may induce residual stresses within the object 102 and cause those residual stresses to build up within the object 102. The residual stresses may weaken the object 102, hastening its damage and failure, if they are permitted to remain within the object 102. The stress-relief furnace 150 may expose the object 102 to the first temperature to relieve the residual stresses.

The stress-relief furnace 150 may include an enclosure 152 sized and shaped to contain the object 102 and handling platform 116 therein and a heat source 154 powered and configured to heat an interior 156 of the enclosure 152 to expose the object 102 to a first temperature. The object 102 may be introduced into the enclosure 152 of the stress-relief furnace 150 through a selectively closable opening 158 in a sidewall of the enclosure 152 utilizing the object-transfer mechanism 140. The heat source 154 may be, for example, one or more resistive heating elements. The first temperature may be, for example, below a lowest critical temperature of a metal material of the object 102. More specifically, the first temperature may be, for example, about 1,200° C. or less. As a specific, nonlimiting example, the first temperature to which the object 102 may be exposed during stress relief may be between about 100° C. and about 700° C. (e.g., between about 200° C. and about 500° C.). The heat source 154 may be at least partially located within the enclosure 152 of the stress-relief furnace 150. For example, the heat source 154 may be entirely located within the enclosure 152 of the heat source 154. As another example, the heating element of the heat source 154 may be located in the enclosure 152, and a remainder of the heat source 154, such as the powering and control apparatus, may be located outside the enclosure 152.

In some embodiments, the object 102 may be subjected to thermal cycling at least partially by the stress-relief furnace 150. For example, the object 102 may be exposed to the first temperature in the stress-relief furnace 150 and subsequently exposed to another, lower temperature. The other temperature may be, for example, about 99° C. or lower. More specifically, the other temperature may be, for example, between about 0° C. and about 75° C. As a specific, nonlimiting example, the other temperature may be between about 20° C. and about 40° C. (e.g., about 35° C.). The thermal cycling involving exposure to the first temperature and the other temperature may be repeated in some embodiments. In some embodiments, the thermal cycling may take place entirely within the stress-relief furnace 150. In other embodiments, at least a portion of the thermal cycling may take place outside the stress-relief furnace 150, such as, for example, in a cooling area located inside or outside the housing 160 of the system 100.

In some embodiments, object 102 may be aged in addition to, or instead of, stress relieving, heat treatment, or both. For example, the object 102 may be exposed to an aging temperature for an extended period of time to induce a desired, beneficial, material state in the object 102. The aging temperature may be, for example, between about 50° C. and about 250° C. Aging may take place, for example, in the stress-relief furnace 150, in the heat-treatment apparatus 164, in the induction heater 199, or another heat-applying device or structure.

In some embodiments, the stress-relief furnace 150 may be physically contained within another housing 160 to form an independently operable module 162. More specifically, the enclosure 152 and heat source 154 may be located within the housing 160 and function cooperatively as an independently operable module 162 to relieve residual stresses within a 3D-printed object 102. The independently operable module 162 may be configured for physical and operative connection to other modules, such as, for example, the independently operable module 136 including the 3D printer 104 and material removal system 126, to form a unified process flow volume 138. In some embodiments, the system 100 may include multiple stress-relief furnaces 150 to enable concurrent stress relieving of multiple objects 102 or multiple batches of objects 102.

The system 100 may include a heat-treatment apparatus 164 operatively connected to, and distinct from, the 3D printer 104 and stress-relief furnace 150. The heat-treatment apparatus 164 may include a heat source 166 configured to expose the object 102 to a second temperature higher than the first, stress-relief temperature to heat-treat the object 102 and a pressure-transmission medium 168 configured to apply pressure to the object 102 during heat treatment. Even after relieving internal stresses, 3D-printed objects 102 may exhibit lower density, increased porosity, undesirable material states (e.g., crystalline structures, grain sizes, grain boundary positions and/or orientations), and lower strength and wear resistance than similarly configured objects produced utilizing other manufacturing techniques, such as subtractive machining. For example, 3D-printed objects for use in a wellbore extending into an earth formation, such as, for example, during formation or enlargement of the wellbore, may not suitably withstand the pressures, temperatures, and abrasive and erosive wear typical of the wellbore environment when only subjected to a stress-relieving process. By performing advanced heat treatment on the 3D-printed object 102, such as those performable utilizing the heat-treatment apparatus 164, object density may be increased, object porosity may be reduced, desirable material states may be induced, and strength and wear resistance of the object may be increased. For example, 3D-printed objects 102 subjected to the advanced heat treatment provided by the heat-treatment apparatus 164 may exhibit sufficient strength, temperature stability, and wear resistance for use in a wellbore. Incorporating the heat-treatment apparatus 164 into a unified process flow volume 138 with the other components of the system 100 may increase efficiency, reduce cost, and produce higher quality objects 102. The heat-treatment apparatus 164 may comprise, for example, a hot isostatic press.

The heat-treatment apparatus 164 may include an enclosure 167 sized and shaped to receive the object 102 and optionally the handling platform 116 therein. The object 102 may be introduced into the enclosure 167 of the heat-treatment apparatus 164 through a selectively closable opening 165 in a sidewall of the enclosure 167 utilizing the object-transfer mechanism 140. In some embodiments, the system 100 may include multiple heat-treatment apparatuses 164 to enable concurrent heat treatment of multiple objects 102 or multiple batches of objects 102.

The heat source 166 may comprise, for example, one or more resistance heating elements. The second temperature may be, for example, greater than the first temperature and above a lowest critical temperature of a metal material of the object 102. More specifically, the first temperature may be, for example, about 450° C. or more. As a specific, nonlimiting example, the first temperature may be between about 500° C. and about 2,000° C. (e.g., between about 750° C. and about 1,500° C.). The heat source 166 may be at least partially located within the enclosure 167 of the heat-treatment apparatus 164. For example, the heat source 166 may be entirely located within the enclosure 167 of the heat-treatment apparatus 164. As another example, the heating element of the heat source 166 may be located in the enclosure 167, and a remainder of the heat source 166, such as the powering and control apparatus, may be located outside the enclosure 167.

The pressure-transmission medium 168 may be, for example, an atmospheric fluid, a vacuum bag, or a container filled with a particulate substance (e.g., sand). Pressures applied by the pressure-transmission medium 168 during exposure of the object 102 to the second temperature may be, for example, about 50 MPa or more. More specifically, the pressures applied by the pressure-transmission medium 168 during exposure of the object 102 to the second temperature may be, for example, about 100 MPa or more. As a specific, nonlimiting example, the pressures applied by the pressure-transmission medium 168 during exposure of the object 102 to the second temperature may be, for example, between about 75 MPa and about 350 MPa (e.g., between about 100 MPa and about 200 MPa). The pressure applied by the pressure-transmission medium 168 may be, for example, substantially isostatic. The pressure-transmission medium 168 may be at least partially located within the enclosure 167 of the heat-treatment apparatus 164. For example, the pressure-transmission medium 168 may be entirely located within the enclosure 167 of the heat-treatment apparatus 164. As another example, the pressure-applying apparatus of the pressure-transmission medium 168 may be located in the enclosure 167, and controlling equipment for the pressure-transmission medium 168 may be located outside the enclosure 167.

In some embodiments, the heat-treatment apparatus 164 may include an atmosphere control device 170 operatively connected to an atmospheric fluid source 172 to control or vary at least a composition of an atmosphere within the heat-treatment apparatus 164. The atmosphere control device 170 may be further configured to control a pressure within the heat-treatment apparatus 164 in some embodiments. For example, the enclosure 167 may be sealed and active flow of atmospheric fluid from the atmospheric fluid source 172 into the enclosure 167 may raise the pressure therein, thereby applying pressure to the object 102 utilizing the atmospheric fluid. The atmosphere control device 170 may include, for example, a selectively activatable valve 175 and sensing equipment to determine and control a composition of the atmosphere within the enclosure 167 (e.g., photometric sensors, spectrophotometric sensors, electrometric sensors, chromatographic sensors) and, optionally, atmospheric pressure within the enclosure 167 (e.g., pressure transducers, pressure transmitters, pressure senders, pressure indicators, piezometers, manometers). The atmospheric fluid within the atmospheric fluid source 172 may be, for example, an inert gas. More specifically, the atmospheric fluid within the atmospheric fluid source 172 may include, for example, argon. The atmospheric fluid source 172 may be, for example, a tank containing the atmospheric fluid, optionally under pressure.

The atmosphere control device 170 and atmospheric fluid source 172 may be at least partially located within the enclosure 167 of the heat-treatment apparatus 164. For example, the atmosphere control device 170 and atmospheric fluid source 172 may be entirely located within the enclosure 167 of the heat-treatment apparatus 164. As another example, the atmosphere control device 170 may be located in the enclosure 167, and the atmospheric fluid source 172 may be located outside the enclosure 167.

The system 100 may include a quenching volume 174 operatively connected to the heat-treatment apparatus 164. The quenching volume 174 may include a reservoir 178 sized and shaped to receive the object 102 and optionally the handling platform 116 therein. The quenching volume 174 may be located below the heat-treatment apparatus 164 in some embodiments, such that the object 102 may be introduced into the reservoir 178 of the quenching volume 174 through an opening 180 at a top of the reservoir 178 by dropping the object through a selectively sealable opening 182 at a bottom of the heat-treatment apparatus 164.

The quenching volume 174 may include a quenching medium, such as, for example, a fluid 176 in which to immerse the object 102 to control its cooling, preserving or inducing a beneficial material state (e.g., crystalline structures, grain sizes, grain boundary positions and/or orientations) within the object 102. The quenching fluid 176 may be located within the reservoir 178, and may include, for example, water, oil, nitrogen, argon, or any other liquid or gas configured to control the temperature and cooling rate of the object 102 while within the quenching volume 174.

In some embodiments, the quenching volume 174 may include a temperature control device 184, a fluid circulation device 186, or a temperature control device 184 and a fluid circulation device 186 operatively connected to the quenching volume 174 to control cooling of the object in the quenching volume 174. The temperature control device 184 may be, for example, a heating element (e.g., a resistive heating element) or a cooling element (e.g., a thermoelectric cooler). The temperature control device 184 may be located, for example, in the quenching fluid 176 within the reservoir 178 of the quenching volume 174 or outside the reservoir 178 of the quenching volume 174 while in thermal communication with the quenching fluid 176. The fluid circulation device 186 may be, for example, a pump. The fluid circulation device 186 may be at least partially located within the reservoir 178. For example, the fluid circulation device 186 may be entirely located within the reservoir 178. As another example, ports of the fluid circulation device 186 may open to the reservoir 178, and a driving portion of the fluid circulation device 186 may be located outside the reservoir 17R. In some embodiments, the system 100 may include multiple quenching volumes 174 to enable concurrent quenching of multiple objects 102 or multiple batches of objects 102.

In some embodiments, the heat-treatment apparatus 164 and quenching volume 174 may be physically contained within another housing 188 to form an independently operable module 190. More specifically, the enclosure 167, heat source 166, pressure-transmission medium 168, atmosphere control device 170, atmospheric fluid source 172, reservoir 178, quenching fluid 176, temperature control device 184, and fluid circulation device 186 may be located within the housing 188 and function cooperatively as an independently operable module 190 to densify and induce desirable material states within a 3D-printed object 102. The independently operable module 190 may be configured for physical and operative connection to other modules, such as, for example, the independently operable module 162 including the stress-relief furnace 150, to form a unified process flow volume 138.

The object-transfer mechanism 140 may be operatively connected to at least the 3D printer 104, stress-relief furnace 150, and heat-treatment apparatus 164. For example, the object-transfer mechanism 140 may be configured to selectively move the handling platform 116 and the object 102 supported thereon at least from the 3D printer 104 to the stress-relief furnace 150, and from the stress-relief furnace 150 to the heat-treatment apparatus 164. In some embodiments, the object-transfer mechanism 140 may be further configured to move the object 102 from the heat-treatment apparatus 164 to the quenching volume 174, and to move the handling platform 116 from the heat-treatment apparatus 164 back to the 3D printer 104. For example, the object-transfer mechanism 140 may extend through openings 148, 158, 165 in the sidewalls of the independently operable modules 136, 162, 190 to move the 3D-printed object 102 between modules 136, 162, 190.

In some embodiments, the system 100 may include an induction heater 199 configured to heat the object 102. The induction heater 199 may be in addition to, or in replacement of, the stress-relief furnace 150, the heat-treatment apparatus 164, or both. The induction heater 199 may be located, for example, at least partially in the enclosure 106 of the 3D printer 104, at least partially in the enclosure 152 of the stress-relief furnace 150, in the enclosure 167 of the heat-treatment apparatus 164, in its own dedicated module or enclosure, or outside the shared housing 192 of the system 100. The induction heater 199 may include, for example, an induction heating coil and an induction blanket configured to be positioned adjacent to at least a portion of the object 102 (e.g., at least partially wrapped around at least a portion of the object 102) to heat the object 102 for stress relief. In some embodiments, the induction heater 199 may require human intervention to position the induction heater 199 adjacent to the at least a portion of the object 102. In other embodiments, at least a portion of the induction heater 199 may be positioned adjacent to the at least a portion of the object 102 with automated assistance. In some embodiments, the system 100 may include multiple induction heaters 199 to enable concurrent heating of multiple objects 102. Illustrative embodiments of induction heaters are disclosed in U.S. Pat. No. 6,528,771, issued Mar. 4, 2003, to Matsen et al. and U.S. Patent App. Pub. No. 2013/0341320, published Dec. 26, 2013, to Tailor et al., the disclosure of each of which is incorporated herein in its entirety by this reference.

The 3D printer 104, material removal system 126, stress-relief furnace 150, heat-treatment apparatus 164, quenching volume 174, and object-transfer mechanism 140 may be incorporated into a unified process flow volume 138. For example, the 3D printer 104, material removal system 126, stress-relief furnace 150, heat-treatment apparatus 164, quenching volume 174, and object-transfer mechanism 140 may be incorporated into a shared housing 192. More specifically, each of the 3D printer 104 and material removal system 126, stress-relief furnace 150, and heat-treatment apparatus 164 and quenching volume 174 may be an independently operable module 136, 162, 190, each module 136, 162, 190 being physically and operatively connected to at least one other module 136, 162, 190, such that the housings 134, 160, 188 of the modules 136, 162, 190 cooperatively form a shared housing 192.

Operations of the system 100 may be at least partially controlled by a control system 194. The control system 194 may include a processing control unit 196. The processing control unit 196 may be, for example, a dedicated-purpose circuit or a programmable logic circuit (e.g., a processor or microprocessor) configured to execute special-purpose software to control operation of the system 100. The processing control unit 196 may be operatively connected to a nontransitory memory storage device 198, which may contain dedicated software to be executed by the processing control unit 196, may record feedback from the modules 136, 162, 190 and/or processing control unit 196, or both. The non-transitory memory storage device 198 may be, for example, Synchronous Random Access Memory (SRAM), Dynamic RAM (DRAM), Read-Only Memory (ROM), Flash memory, HD, and the like. The control system 194 may be operatively connected to each of the 3D printer 104, material removal system 126, stress-relief furnace 150, heat-treatment apparatus 164, quenching volume 174, and object-transfer mechanism 140 to control the operations thereof.

Figure 2:
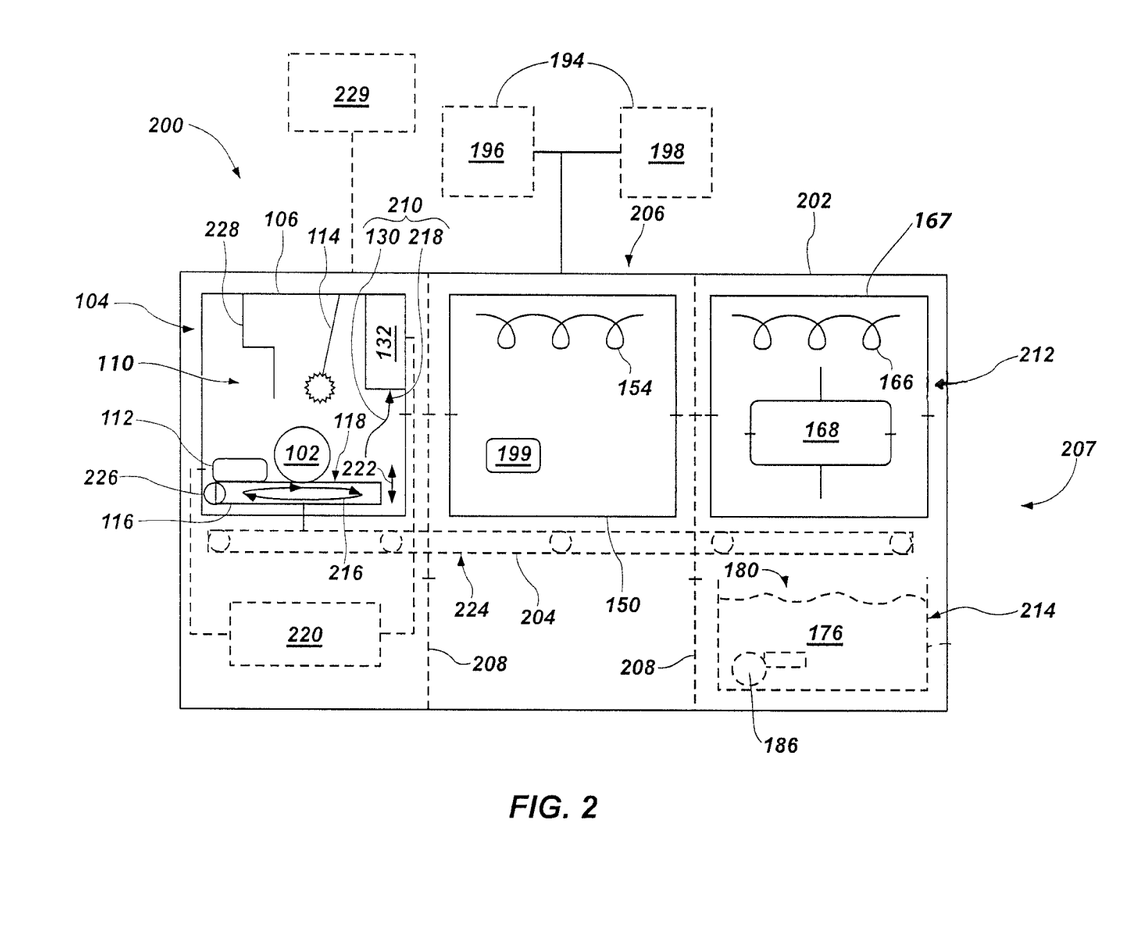
FIG. 2 is a schematic side view of another embodiment of a system for creating and heat-treating a 3D-printed object.

FIG. 2 is a schematic side view of another embodiment of a system 200 for creating and heat-treating a 3D-printed object 102. The system 200 may be at least substantially similar to the system 100 described previously in connection with FIG. 1, with differences described in greater detail below. The features of the system 200 shown in FIG. 2 may be combined with, or substituted for, the features of the system 100 shown in FIG. 1.

In some embodiments, the 3D printer 104, material removal system 210, stress-relief furnace 150, heat-treatment apparatus 212, quenching volume 214, and object-transfer mechanism 204 may be incorporated into a single, unitary, integrated machine 202. For example, the machine 202 may be a special-purpose, dedicated device configured to perform a specific set of tasks utilizing a fixed set of equipment. More specifically, the machine 202 may lack independently operable, physically removable modules. As a specific, nonlimiting example, the machine 202 may include a single external housing 206 within which the 3D-printer 104, material removal system 210, stress-relief furnace 150, heat-treatment apparatus 212, quenching volume 214, object-transfer mechanism 204, and any other components and/or subsystems of the machine 202 may be located. Barriers 208 may subdivide the housing 206 into functional subsystems similar to, though configured differently from, not independently operable like, and not physically separable like the modules 136, 162, 190 described previously in connection with FIG. 1. The housing 206 may form a unified process flow volume 207.

In some embodiments, the vacuum 218 of the material removal system 210 may require human intervention to accomplish operation. For example, an operator may open the opening 110 of the enclosure 106, grasp the hose 130, and position the hose 130 proximate unbonded material within the enclosure 106 when the 3D printer 104 (e.g., the focused heat source 114 and any other components used to additively manufacture the object 102) is not in active use.

In some embodiments, a material recycling system 220 separate from the precursor material source 112 and receptacle 132 may be located within the housing 206. For example, the material recycling system 220 may be operatively connected to the precursor material source 112 and receptacle 132, and may be configured to transfer unbonded material from the receptacle 132, through the material recycling system 220, to the precursor material source 112 (e.g., utilizing pressure differentials to cause unbonded material to flow with a carrier fluid, such as, for example, atmospheric fluid). In some embodiments, the material recycling system 220 may be configured to clean material, sift material into groups exhibiting distinct average particle sizes, and discard particles exceeding a threshold maximum particle size. For example, the material recycling system 220 may include solvents to remove contaminants that may come into contact with the material within the enclosure 106, and mesh filters to filter out particles of varying sizes.

In some embodiments, a handling platform rotator 216 may be oriented to rotate the object 102 about an axis of rotation perpendicular to the surface 118 of the handling platform 116, such that the object 102 spins about the axis on the surface 118 of the handling platform 116 without turning over the handling platform 116. In some embodiments, an object vibrator 222 may be oriented to vibrate the object 102 in a direction at least substantially perpendicular to the surface 118 of the handling platform 116.

In some embodiments, the object-transfer mechanism 204 may include a conveyor belt 224. For example, the conveyor belt 224 may be operatively connected to the handling platform 116, and may selectively move the handling platform 116 from one subsystem to the next subsystem. In some embodiments, the object-transfer mechanism 204 may include the robotic arm 142 (see FIG. 1) operatively connected to the conveyor belt 224, such that the robotic arm 142 (see FIG. 1) may be movable along a horizontal plane by the conveyor belt 224. In some embodiments, the object-transfer mechanism 204 may include a hinge 226 operatively connected to the handling platform 116, the hinge 226 enabling the handling platform 116 to rotate and drop the object 102 when desired, such as, for example, to immerse the object in the quenching volume 214.

In some embodiments, the 3D printer 104 may include a subtractive manufacturing system 228 located within the enclosure 106 of the 3D printer 104. The subtractive manufacturing system 228 may be configured to remove material from the 3D-printed object 102 after it has been additively manufactured by the focused heat source 114 and precursor material source 112. Subtractive manufacturing may include, for example, part removal. The subtractive manufacturing system 228 may include, for example, an ultrasonic machining system, a milling machine, a turning machine, a drilling machine, a laser machining machine, a grinding machine, an EDM (Electrical Discharge Machining) machine or other subtractive manufacturing systems. More specifically, the subtractive manufacturing system 228 may include a material removal component (e.g., a mill) and a cooling and chip management component (e.g., spray pistol and pump, oil and emulsion mist separator, mechanical filter and cooling by air blast through spindle center, etc.). In other embodiments, a material removal system 229, such as that described above, may be included in a separate machine or independently operable module. In some embodiments, the system 200 may include multiple subtractive manufacturing systems 228 to enable concurrent quenching of multiple objects 102 or multiple batches of objects 102.

Figure 3:
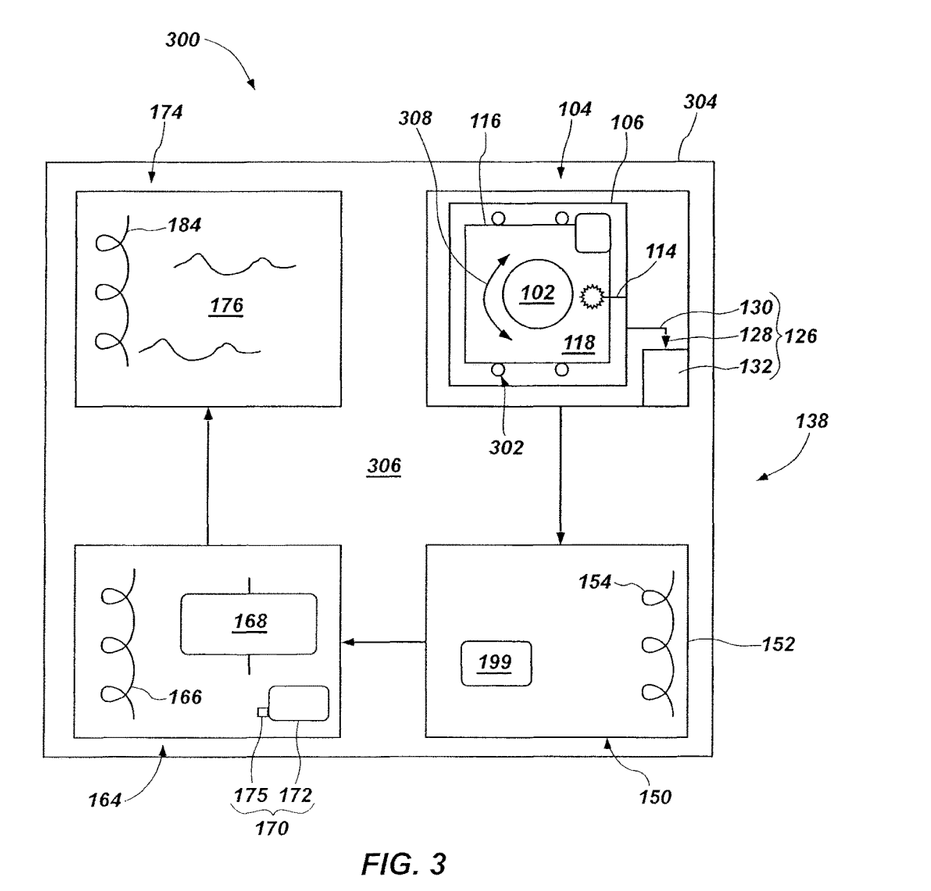
FIG. 3 is a schematic top view of yet another embodiment of a system for creating and heat-treating a 3D-printed object.

FIG. 3 is a schematic top view of yet another embodiment of a system 300 for creating and heat-treating a 3D-printed object 102. In some embodiments, the 3D printer 104, material removal system 126, stress-relief furnace 150, heat-treatment apparatus 164, quenching volume 174, and object-transfer mechanism 302 may be located within a dedicated building 304 or a dedicated space 306 within a building 304. For example, the dedicated building 304 or a dedicated space 306 within a building 304 may house special-purpose, dedicated equipment configured to perform a specific set of tasks. More specifically, the dedicated building 304 or a dedicated space 306 within a building 304 may include subdivided process areas for performing one or more tasks in the process of forming, stress-relieving, and heat-treating a 3D-printed object 102. The dedicated building 304 or a dedicated space 306 within a building 304 may form a unified process flow volume 138.

The object-transfer mechanism 302 in such embodiments may be configured to move at least one object 102 and optionally the associated handling platform 116 from one process area to another. For example, the object-transfer mechanism 302 may be incorporated into, or may approach and attach itself to, the handling platform 116 (e.g., as wheels or treads) to move the handling platform 116 and object 102.

In some embodiments, an object vibrator 308 may be oriented to oscillate in a rotating manner about an axis at least substantially perpendicular to the surface 118 of the handling platform 116.

Figure 4:
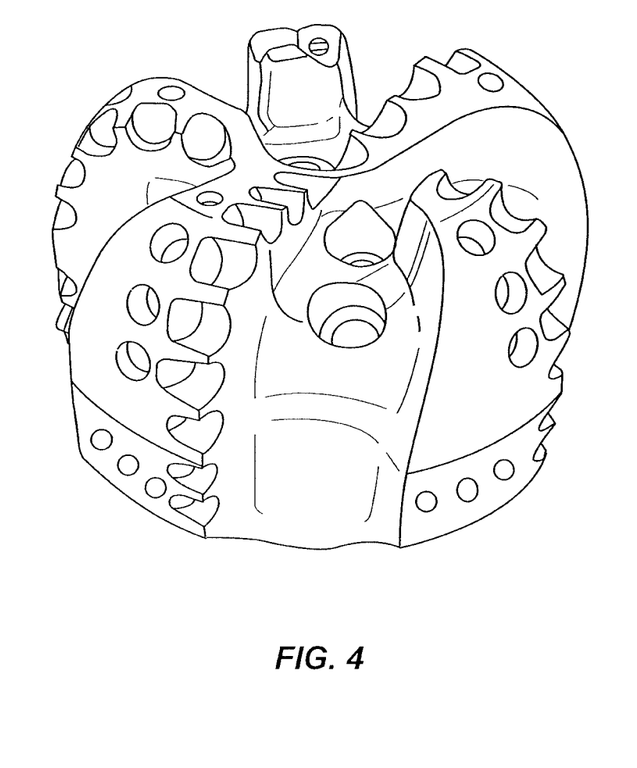
FIG. 4 is a schematic side view of an earth-boring tool body in the form of a drill bit body formed using an embodiment of the present disclosure.

Embodiments of the present disclosure may reduce (e.g., eliminate) the need for transporting 3D-printed workpieces to other locations for subsequent treatment acts such as stress relief, heat treatment, quenching, subtractive manufacturing, surface finishing, and descaling, speeding the production process and eliminating handling and transport to reduce cost. Further, embodiments of the present disclosure enable production of a substantially finished product, such as an earth-boring tool body in the form of a drill bit body (FIG. 4), requiring little or no finish machining. Other downhole tools used for drilling during the formation or enlargement of a wellbore in a subterranean formation and components thereof, such as, for example, rotary drill bits, percussion bits, core bits, eccentric bits, bicenter bits, reamers, mills, drag bits, roller cone bits, hybrid bits, turbines, valves, rotors, stators, and other drilling bits and tools and components thereof known in the art, may be produced utilizing the systems and methods disclosed in this application. Thus, product customization for particular applications using 3D printing may be achieved at higher efficiency and lower cost.

Additional, nonlimiting embodiments within the scope of this disclosure include the following:

Embodiment 1

A system for creating and heat-treating a 3D-printed object, comprising: a 3D printer configured to create an object; and a heat-treatment apparatus operatively connected to, and distinct from, the 3D printer, the heat-treatment apparatus configured to expose the object to an elevated temperature to heat-treat the object and comprising a pressure-transmission medium configured to apply pressure to the object during heat treatment, wherein the 3D printer and heat-treatment apparatus are incorporated into a unified process flow volume.

Embodiment 2

The system of Embodiment 1, wherein the 3D printer comprises a handling platform sized and shaped to support the object at least during 3D printing, the handling platform being movable with the object.

Embodiment 3

The system of Embodiment 1 or Embodiment 2, further comprising a material removal system operatively connected to the 3D printer, the material removal system configured to remove material from the enclosure, wherein the material removal system is incorporated into the unified process flow volume.

Embodiment 4

The system of Embodiment 3, further comprising an object vibrator, a handling platform rotator, or an object vibrator and a handling platform rotator operatively connected to the handling platform to agitate the object during material removal by the material removal system.

Embodiment 5

The system of any one of Embodiments 1 through 4, further comprising a stress-relief furnace operatively connected to, and distinct from, the 3D printer and heat-treatment apparatus, the stress-relief furnace configured to expose the object to a temperature below a melting point of the object to reduce residual stresses within the object, wherein the stress-relief furnace is incorporated into the unified process flow volume.

Embodiment 6

The system of any one of Embodiments 1 through 5, wherein a heat source of the heat-treatment apparatus comprises at least one of a furnace and an induction heater.

Embodiment 7

The system of any one of Embodiments 1 through 5, wherein the heat-treatment apparatus comprises a hot isostatic press.

Embodiment 8

The system of any one of Embodiments 1 through 7, further comprising a quenching volume operatively connected to the heat-treatment apparatus, the quenching volume comprising a quenching medium with which to place the object at least partially in contact to control its cooling, wherein the quenching volume is incorporated into the unified process flow volume.

Embodiment 9

The system of Embodiment 8, wherein the quenching volume is located beneath the heat-treatment apparatus, the object being configured to be lowered into the quenching volume after heat treatment in the heat-treatment apparatus.

Embodiment 10

The system of any one of Embodiments 1 through 9, further comprising an object-transfer mechanism operatively connected to at least the 3D printer and heat-treatment apparatus, the object-transfer mechanism configured to move the object at least from the 3D printer to the heat-treatment apparatus, wherein the object-transfer mechanism is incorporated into the unified process flow volume.

Embodiment 11

The system of any one of Embodiments 1 through 10, further comprising a subtractive manufacturing system located within the unified process flow volume.

Embodiment 12

The system of Embodiment 11, wherein the subtractive manufacturing system comprises at least one of an ultrasonic machining system, a milling machine, a turning machine, a drilling machine, an EDM machine, a grinding machine, and a laser machining machine.

Embodiment 13

The system of any one of Embodiments 1 through 12, wherein the heat-treatment apparatus further comprises an atmosphere control device operatively connected to an atmospheric fluid source to control or vary at least a composition of an atmosphere within an enclosure of the heat-treatment apparatus.

Embodiment 14

The system of any one of Embodiments 1 through 13, wherein the 3D printer and heat-treatment apparatus are incorporated into a shared housing.

Embodiment 15

The system of Embodiment 14, wherein each of the 3D printer and heat-treatment apparatus is an independently operable module, at least one of the modules being physically connected to at least one other operable module.

Embodiment 16

The system of Embodiment 14, wherein the 3D printer and heat-treatment apparatus are incorporated into a single, unitary, integrated machine.

Embodiment 17

A method of creating and heat-treating a 3D-printed object, comprising: creating an object utilizing a 3D printer; moving the object from the 3D printer to a heat-treatment apparatus operatively connected to, and distinct from, the 3D printer; and exposing the object to an elevated temperature utilizing the heat-treatment apparatus and applying pressure to the object utilizing a pressure-transmission medium of the heat-treatment apparatus to heat-treat the object; wherein the 3D printer and heat-treatment apparatus are incorporated into a unified process flow volume.

Embodiment 18

The method of Embodiment 17, further comprising moving the object from the heat-treatment apparatus to a quenching volume operatively connected to the heat-treatment apparatus and placing the object at least partially in contact with a quenching medium of the quenching volume to control its cooling, wherein the quenching volume is incorporated into the unified process flow volume.

Embodiment 19

The method of Embodiment 18, wherein the quenching volume is located beneath the heat-treatment apparatus, and wherein moving the object to the quenching volume comprises lowering the object into the quenching volume after heat treatment in the heat-treatment apparatus.

Embodiment 20

The method of any one of Embodiments 17 through 19, wherein moving the object from the enclosure of the 3D printer to the heat-treatment apparatus comprises moving the object from the enclosure of the 3D printer to the heat-treatment apparatus utilizing an object-transfer mechanism operatively connected to at least the 3D printer and heat-treatment apparatus, wherein the object-transfer mechanism is incorporated into the unified process flow volume.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

What is claimed is:

1. A system for creating and heat-treating a 3D-printed object, comprising:
a 3D printer configured to create an object; and
a heat-treatment apparatus operatively connected to, and distinct from, the 3D printer, the heat-treatment apparatus configured to expose the object to an elevated temperature to heat-treat the object and comprising a pressure-transmission medium configured to apply at least substantially isostatic pressure to the object during heat treatment,
wherein the 3D printer and heat-treatment apparatus are incorporated into a unified process flow volume.

2. The system of claim 1, wherein the 3D printer comprises a handling platform sized and shaped to support the object at least during 3D printing, the handling platform being movable with the object.

3. The system of claim 1, further comprising a material removal system operatively connected to the 3D printer, the material removal system configured to remove material from an enclosure of the 3D printer, wherein the material removal system is incorporated into the unified process flow volume.

4. The system of claim 3, further comprising an object vibrator, a handling platform rotator, or an object vibrator and a handling platform rotator operatively connected to a handling platform of the 3D printer to agitate the object during material removal by the material removal system.

5. The system of claim 1, further comprising a stress-relief furnace operatively connected to, and distinct from, the 3D printer and heat-treatment apparatus, the stress-relief furnace configured to expose the object to a temperature below a melting point of the object to reduce residual stresses within the object, wherein the stress-relief furnace is incorporated into the unified process flow volume.

6. The system of claim 1, wherein a heat source of the heat-treatment apparatus comprises at least one of a furnace and an induction heater.

7. The system of claim 1, wherein the heat-treatment apparatus comprises a hot isostatic press.

8. The system of claim 1, further comprising a quenching volume operatively connected to the heat-treatment apparatus, the quenching volume comprising a quenching medium with which to place the object at least partially in contact to control its cooling, wherein the quenching volume is incorporated into the unified process flow volume.

9. The system of claim 8, wherein the quenching volume is located beneath the heat-treatment apparatus, the object being configured to be lowered into the quenching volume after heat treatment in the heat-treatment apparatus.

10. The system of claim 1, further comprising an object-transfer mechanism operatively connected to at least the 3D printer and heat-treatment apparatus, the object-transfer mechanism configured to move the object at least from the 3D printer to the heat-treatment apparatus, wherein the object-transfer mechanism is incorporated into the unified process flow volume.

11. The system of claim 1, further comprising a subtractive manufacturing system located within the unified process flow volume.

12. The system of claim 11, wherein the subtractive manufacturing system comprises at least one of an ultrasonic machining system, a milling machine, a turning machine, a drilling machine, an EDM machine, a grinding machine, and a laser machining machine.

13. The system of claim 1, wherein the heat-treatment apparatus further comprises an atmosphere control device operatively connected to an atmospheric fluid source to control or vary at least a composition of an atmosphere within an enclosure of the heat-treatment apparatus.

14. The system of claim 1, wherein the 3D printer and heat-treatment apparatus are incorporated into a shared housing.

15. The system of claim 14, wherein each of the 3D printer and heat-treatment apparatus is an independently operable module, at least one of the modules being physically connected to at least one other operable module.

16. The system of claim 14, wherein the 3D printer and heat-treatment apparatus are incorporated into a single, unitary, integrated machine.

* * * * *

UNITED STATES PATENT AND TRADEMARK OFFICE
CERTIFICATE OF CORRECTION

PATENT NO. : 10,576,726 B2  
APPLICATION NO. : 15/085555  
DATED : March 3, 2020  
INVENTOR(S) : Madison S. Burns et al.

Page 1 of 1

It is certified that error appears in the above-identified patent and that said Letters Patent is hereby corrected as shown below:

In the Specification

| | | |
|---|---|---|
| Column 4, | Line 26, | change "about such as," to --about 1µm, such as,-- |
| Column 4, | Line 29, | change "about 500 such" to --about 500µm, such-- |
| Column 5, | Line 61, | change "processing, lacer cladding" to --processing, laser cladding-- |
| Column 7, | Line 39, | change "opening **14R** in" to --opening **148** in-- |
| Column 11, | Line 23, | change "**17R**. In some" to --**178**. In some-- |

Signed and Sealed this  
Twenty-eighth Day of April, 2020

Andrei Iancu  
*Director of the United States Patent and Trademark Office*